Oct. 6, 1964

S. ROSENBERG 3,151,564

MARINE POWERED GENERATOR

Filed July 31, 1961

INVENTOR
SIDNEY ROSENBERG
BY *Kingsland, Rogers,
Ezell & Robbins*

ATTORNEYS

United States Patent Office 3,151,564
Patented Oct. 6, 1964

3,151,564
MARINE POWERED GENERATOR
Sidney Rosenberg, 1139 Burch Lane,
University City 30, Mo.
Filed July 31, 1961, Ser. No. 128,042
1 Claim. (Cl. 103—66)

This invention relates to a marine power generator and particularly to a generator having a plate mounted adjacent the water level of a body of water in position for moving in response to the driving force of water waves to operate a power transmitting mechanism.

This marine power generator is designed to utilize a portion of the tremendous forces that are available in tidal and other water waves and to convert these forces into useful energy. The generator includes a dock or other sturdy support that is anchored with an upstanding part in the path of water waves. The dock pivotally supports a steel plate that normally rests away from the dock, but that can be pivoted toward the dock by the driving force of a wave striking the plate. A piston assembly or other power transmitting device is mounted between the plate and the dock with the piston or movable element of the assembly being connected for reciprocation when the plate is driven by the waves. The cylinder within which the piston slides is connected to a fluid supply which fills the cylinder on the exhaust stroke of the piston. Upon a driving stroke of the piston, which occurs when the plate is pivoted by a water wave, the fluid is driven through an outlet port from the cylinder and delivered by a conduit to a point of utilization.

A principal object of this invention is to provide a marine power generator having a movable plate positioned for movement in response to the driving force of water waves to generate useful power.

Another object of the invention is to provide a pivotally supported plate positioned in the path of on-coming water waves with the plate being connected to the piston of a piston and cylinder assembly having fluid supply and outlet ports, wherein the reciprocation of the piston causes circulation of the fluid for the generation of power.

Other objects and advantages will be apparent to those skilled in the art.

Figure 1:
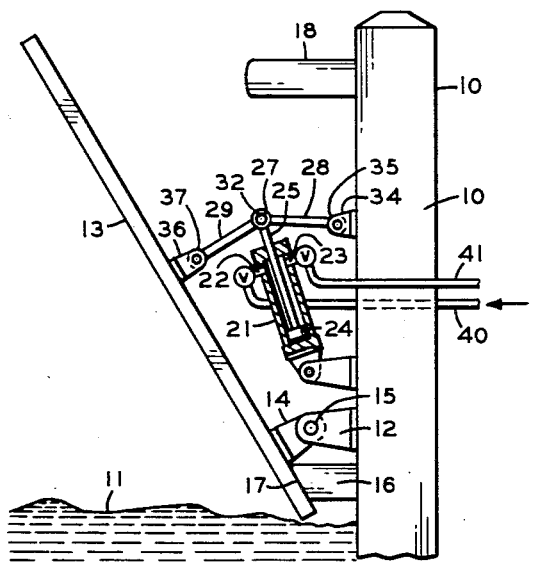
FIGURE 1 is a side elevation view of the marine power generator in its normal position.

The support for the marine power generator is illustrated in the form of a pair of spaced posts or dock members 10 which project upwardly above the surface of a body of water 11. These posts 10 may be anchored to the floor of water 11, or they may be supported upon floats (not shown) so that they will rise and fall with the changing water level.

The dock members 10 have brackets 12 attached to them near the surface of the water 11. A steel plate 13 has a pair of mating brackets 14 near its lower end that are pivotally connected at 15 to the brackets 12 through suitable bearings such as roller bearings or the like. The center of gravity of the plate 13 is above the brackets 14 so that the plate 13 normally tends to swing outwardly away from the dock members 10. If desired, a weight could be attached near the top of the plate 13 to speed its return to normal position. There is a stop 16 supported by the dock members 10, the outer end 17 of which limits the swinging movement of the plate 13 when the lower end of the plate 13 abuts the end 17 of the stop 16. There is a bumper guard 18 supported near the upper end of the dock members 10 against which the plate 13 hits when pivoted toward the dock members to prevent damage to the power transmitting mechanism to be described. Both the bumpers 16 and 18 are covered with a resilient substance, such as rubber, to relieve the impact with the steel plate 13.

A bracket 20 is attached to each dock member 10 near the hinged brackets 12. The bracket 10 pivotally supports the lower end of a cylinder 21. The cylinder 21 has an inlet port 22 and an outlet port 23 in it. There is a piston member 24 that is slidable within the cylinder 21 with a rod 25 attached to the piston member 24 to cause it to reciprocate.

The free end 26 of the rod 25 has a hole 27 through it. There are a pair of rocker arms 28 and 29 having ends 30 and 31, respectively, positioned adjacent one another and on opposite sides of the ends 26 of the rod 25. A pin 32 passes through the ends 30 and 31 of the rocker arms 28 and 29 and through the end 26 of the rod 25 to pivotally connect together the rods 28 and 29 and the piston rod 25. A mounting bracket 34 is attached to the dock member 10 and an end 35 of the rocker arm 28 is pivotally supported by the bracket 34. A similar bracket 36 is attached to the plate 13 and the end 37 of the rocker arm 29 is pivotally attached to the bracket 36. All of the connections of the rocker arms 28 and 29 and of the piston rod 25 may have suitable roller bearings or the like to reduce friction.

By means of the connections just described, the rocker arms 28 and 29 cooperate somewhat in the manner of a hinge as the steel plate 13 pivots about the bracket connections 15. The pivoting of the rocker arms 28 and 29 causes the piston rod 25 to reciprocate between the positions illustrated in FIGURE 1 and FIGURE 2. This, in turn, causes the piston member 24 to reciprocate within the cylinder 21.

A flexible fluid conduit 40 is connected to the inlet port 22 of the cylinder. Another flexible fluid conduit 41 is connected to the outlet port 23. The flexible conduit 40 has a one-way valve 42 that permits fluid flow only into the cylinder 21, as indicated by the arrow in FIGURE 1. A one-way valve 43 permits fluid flow in the conduit 41 in a direction out of the cylinder only.

Figure 2:
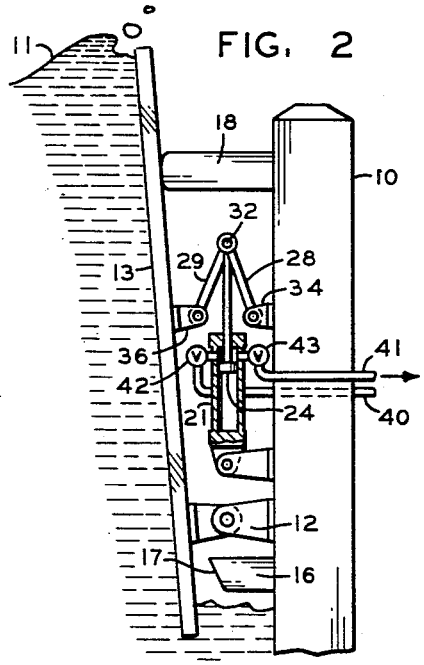
FIGURE 2 is a side elevation view of the marine power generator in a position immediately following a power generating stroke.
Figure 4:
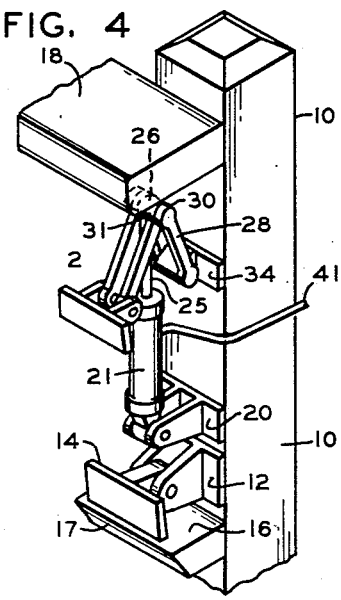
FIGURE 4 is a fragmentary isometric view of the power transmitting parts of the invention.
Figure 3:
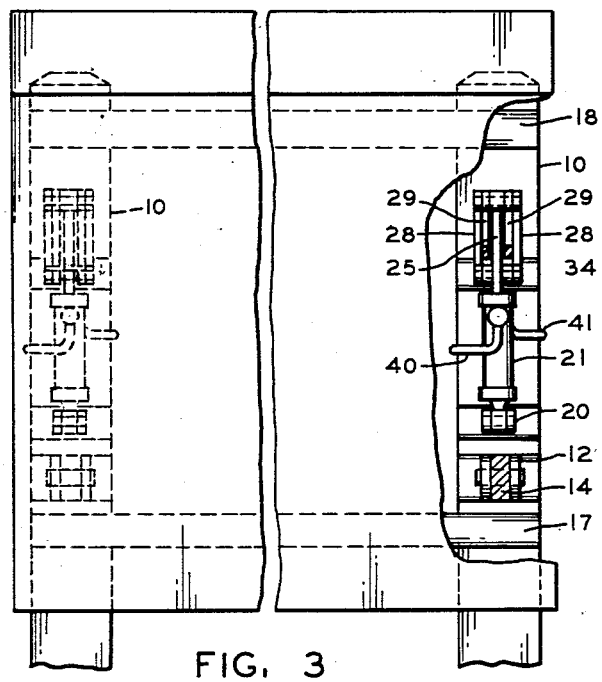
FIGURE 3 is a fragmentary front elevation view, partly in section, of the marine power generator.

In operation, when a wave strikes the plate 13, the force of the wave drives the plate from the position shown in FIGURE 1 toward the position shown in FIGURE 2 until the plate strikes the bumper 18. As the plate 13 pivots about the hinge connections 15, it acts through the lever arm assemblies 28 and 29 to raise the piston member 24. This forces fluid out of the cylinder through the outlet port 23. The valve 42 prevents fluid from escaping through the inlet port 22. This fluid which is driven from the cylinder 21 is transmitted through the conduit 41 to a point of utilization. The several cylinders 21 may be connected to a single fluid receiver, or each may be connected to a different one.

When the water wave passes, the plate 13 falls away from the dock members 10. As the plate returns to the position of FIGURE 1, the piston is returned to its original position. This movement of the piston is its suction stroke during which it draws fluid from the conduit 40 through the inlet port 22. During the suction stroke, the valve 43 prevents fluid from entering the cylinder from the conduit 41. Thus, the back and forth movements of the plate 13 cause fluid to circulate through the conduits 40 and 41.

If desired, the dock members 10 could be mounted upon floats. Then the marine power generator would rise and fall with the level of the sea, and the plate 13 would always be in the path of the water waves.

While two cylinders 21 are shown in the drawing, other members or other forms of cylinders might be used.

Various changes and modifications may be made within the process of this invention as will be readily apparent to those skilled in the art. Such changes and modifications are within the scope and teaching of this invention as defined by the claims appended hereto.

What is claimed is:

A marine power generator comprising a dock projecting above the surface of a large body of water, a generally vertical plate pivotally supported adjacent its base by the dock, the plate being exposed to open sea waves, means for normally pivoting the plate away from the dock, stop means on the dock engageable by the lower end of the plate for limiting the pivotal movement of the plate away from the dock, the stop means being positioned to stop the plate at an acute angle to the vertical plane so the plate will be affected by horizontally moving waves, bumper means on the dock engageable by the upper end of the plate for limiting the pivotal movement of the plate toward the dock in response to horizontally moving waves, and power generating means connected to the plate for generating power as the plate moves.

References Cited in the file of this patent
UNITED STATES PATENTS

| | | |
|---|---|---|
| 616,468 | Jones | Dec. 27, 1898 |
| 651,327 | Gifford | June 5, 1900 |
| 874,589 | Henderson | Dec. 24, 1907 |
| 918,870 | Lawrence | Apr. 20, 1909 |
| 1,032,337 | Kindleberger | July 9, 1912 |
| 1,074,060 | Melander | Sept. 23, 1913 |
| 2,278,818 | Zoppa | Apr. 7, 1942 |